(12) United States Patent
Okazaki

(10) Patent No.: US 9,486,961 B2
(45) Date of Patent: Nov. 8, 2016

(54) MANUFACTURING DEVICE FOR THREE-DIMENSIONAL LAMINATE SHAPED OBJECT

(71) Applicant: SODICK CO., LTD., Kanagawa (JP)

(72) Inventor: Shuji Okazaki, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 120 days.

(21) Appl. No.: 14/712,934

(22) Filed: May 15, 2015

(65) Prior Publication Data

US 2015/0328836 A1 Nov. 19, 2015

(30) Foreign Application Priority Data

May 15, 2014 (JP) ................................ 2014-101522

(51) Int. Cl.
*B29C 67/00* (2006.01)
*B33Y 30/00* (2015.01)
*B22F 3/105* (2006.01)

(52) U.S. Cl.
CPC ......... *B29C 67/0085* (2013.01); *B22F 3/1055* (2013.01); *B29C 67/0077* (2013.01); *B33Y 30/00* (2014.12); *B22F 2003/1056* (2013.01); *Y02P 10/295* (2015.11)

(58) Field of Classification Search
CPC .. B29C 67/0077; B33Y 30/00; B22F 3/1055
See application file for complete search history.

(56) References Cited

U.S. PATENT DOCUMENTS

| | | | | | |
|---|---|---|---|---|---|
| 5,358,673 A * | 10/1994 | Heller | ..................... | B29C 41/36 | 156/273.5 |
| 6,554,600 B1 * | 4/2003 | Hofmann | ............ | B29C 67/0077 | 264/497 |
| 8,845,319 B2 * | 9/2014 | Oberhofer | ............. | B22F 3/1055 | 264/255 |
| 9,149,870 B2 * | 10/2015 | Minick | .................. | B22F 3/1055 | |
| 2003/0006001 A1 * | 1/2003 | Yang | .................... | B29C 67/0074 | 156/250 |
| 2011/0252618 A1 * | 10/2011 | Diekmann | .......... | B29C 67/0077 | 29/401.1 |
| 2011/0278773 A1 * | 11/2011 | Bokodi | ............... | B29C 67/0085 | 264/497 |
| 2014/0165381 A1 * | 6/2014 | Rauschenbach | ...... | B22F 3/1055 | 29/592.1 |
| 2014/0265047 A1 * | 9/2014 | Burris | ................ | B23K 26/0807 | 264/497 |
| 2015/0202687 A1 * | 7/2015 | Pialot | .................... | B22F 3/1055 | 419/55 |

FOREIGN PATENT DOCUMENTS

| | | |
|---|---|---|
| JP | 2000-052436 | 2/2000 |
| JP | 4351218 | 10/2009 |
| JP | 2011225994 | 11/2011 |
| JP | 2013-195041 | 9/2013 |

* cited by examiner

*Primary Examiner* — Alison L Hindenlang
*Assistant Examiner* — Jerzi H Moreno Hernandez
(74) *Attorney, Agent, or Firm* — Jianq Chyun IP Office

(57) ABSTRACT

The manufacturing device manufactures a laminate shaped object by supplying material powder to a molding chamber to form a powder layer and irradiating a surface of the powder layer with a beam to sinter the powder layer. The molding chamber has a molding space where the material powder is irradiated with the beam and the laminate shaped object is formed, and a non-molding space which is outside the molding space and in which the laminate shaped object is not formed. An elastic member is disposed in the non-molding space, and the elastic member extends or contracts to change volume along with change of a relative position of the table in a vertical direction.

6 Claims, 6 Drawing Sheets

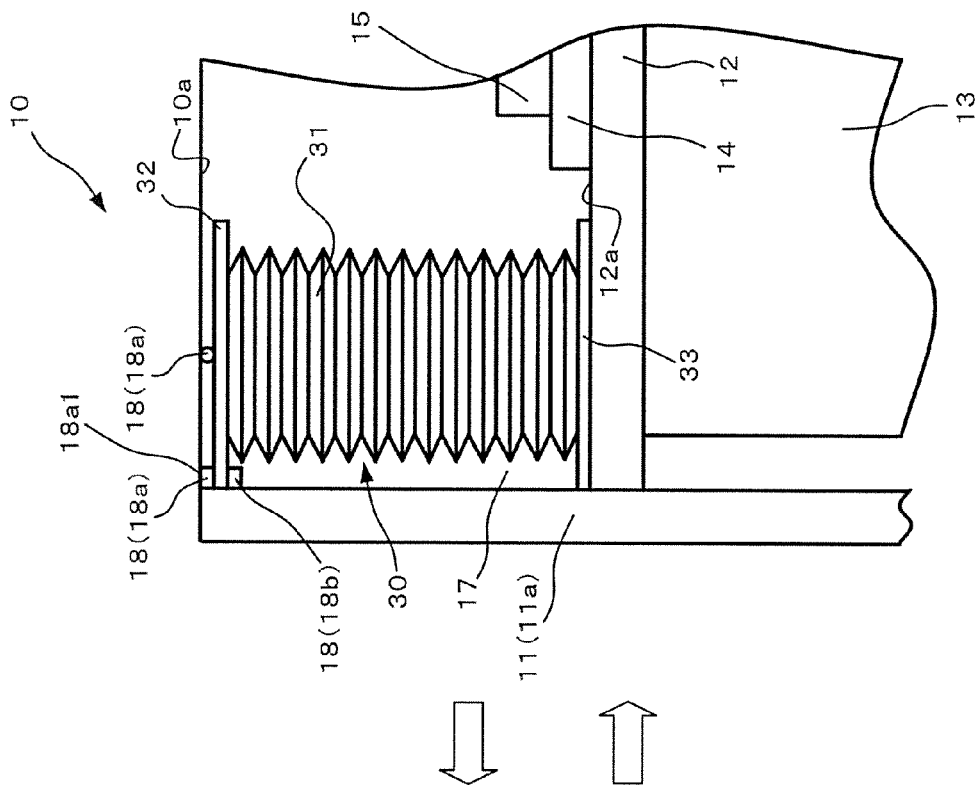
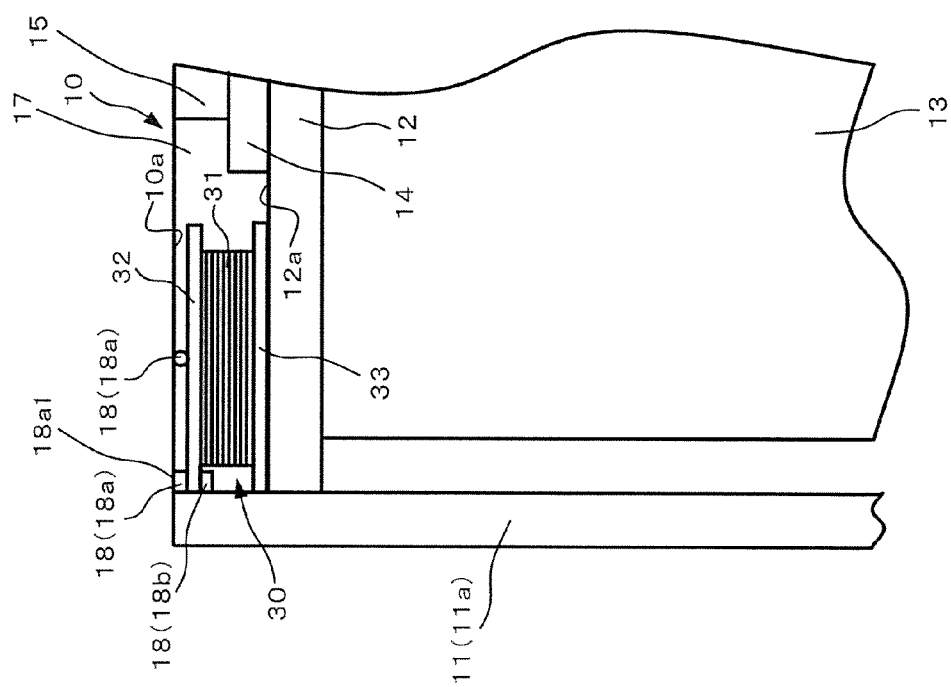

MANUFACTURING DEVICE FOR THREE-DIMENSIONAL LAMINATE SHAPED OBJECT

CROSS-REFERENCE TO RELATED APPLICATION

This application claims the priority benefit of Japan application serial no. 2014-101522, filed on May 15, 2014. The entirety of the above-mentioned patent application is hereby incorporated by reference herein and made a part of this specification.

BACKGROUND OF THE INVENTION

1. Field of the Invention

The present invention relates to a manufacturing device for a three-dimensional laminate shaped object, and in particular, relates to a manufacturing device for a three-dimensional laminate shaped object where the volume of a molding space in a molding chamber is changeable.

2. Description of Related Art

A manufacturing device of a three-dimensional laminate shaped object forms a sintered layer by irradiating a powder layer, composed of material powder for example, with a beam to sinter the powder layer; lays out a new powder layer on top of the sintered layer; forms a new sintered layer that is bonded to the sintered layer below by irradiating the new powder layer with a beam to sinter the new power layer; and then repeats the above steps, so as to manufacture a desired three-dimensional laminate shaped object having multiple sintered layers laminated integrally.

Such a manufacturing device is for example disclosed in Patent Document 1. The manufacturing device of Patent Document 1 supplies the material powder from a powder supplying device to a flattening device, and while supplying the material powder to the molding chamber through the flattening device to form a powder layer, the manufacturing device levels the surface of the powder layer. The flattening device has an elongated structure along the Y-axis direction. The powder material is supplied to the flattening device through the powder supplying device at a predetermined position along a longitudinal direction (Y-axis direction) of the flattening device. By moving the flattening device to a predetermined position along an X-axis direction, it is possible to supply the material powder corresponding to a desired molding space. The material powder that is supplied to the molding space is irradiated with a laser (laser beam) so as to form a sintered layer. The terminal ends (outer surface) of the formed sintered layer are then sliced and processed using an end mill (slicing equipment) so as to form a shaped object.

In Patent Document 1, during the production of the laminated shaped object, the material powder is spread into the entire space of the molding chamber. However, since the space where the laminate shaped object is actually formed constitutes only a part of the region in the molding chamber, the material powder that is spread outside of the said region is recovered to be reused. In this situation, in the recovered powder, the reusable material powder is mixed with the sliced powder generated by slice processing. Therefore, in order to reuse the material powder, the two types of powders mentioned above are sorted, and a work process to collect the reusable material powder would be necessary. In such an occasion, if the amount of recovered powder is large, then the work burden would also increase. Therefore, it is desirable to minimize the amount of material powder that is supplied to the molding chamber to reduce the amount of material powder that is spread outside of the region used to form the laminate shaped object.

Thus, as described in Patent Document 2, by limiting the laying space for the material powder in the molding chamber, a manufacturing device for a three-dimensional laminate shaped object that can reduce an amount of the supplied material powder is provided. In the manufacturing device for a three-dimensional laminate shaped object as described in Patent Document 2, provided are a table that moves along a vertical direction during the molding of the laminate shaped object; an attachment where the material powder is deposited, wherein the attachment is attached to the upper surface of the table and has a smaller area than the table when viewed from above; and additional side walls that are fitted without a gap and are foldable corresponding to the attachment. As such, in the molding chamber, a space surrounded by the attachment and the side walls is formed, wherein the material powder is spread within the space. In other words, in the entire space of the molding chamber, the space where the material powder is spread will be limited within the space surrounded by the aforementioned attachment and additional sidewalls. Therefore, as compared to the case where the material powder is spread to the entire space of the molding chamber, the spreading space of the material powder is reduced. As such, the amount of material powder that is supplied to the molding chamber is suppressed, and a recovered amount of the material powder is reduced after forming the laminate shaped object.

PATENT DOCUMENTS

Patent Document 1: Japanese Patent No. 4351218.
Patent Document 2: Japanese Patent Publication No. 2011-225994.

SUMMARY OF THE INVENTION

Problems to be Solved

During the sintering of the material powder by beam irradiation, for the component where the powder material is spread, there is a fear for deformation such as warping due to the heat transferred. In the manufacturing device for the three-dimensional laminate shaped object as described in Patent Document 2, since the material powder is spread onto the upper surface of the attachment, there is a possibility that a deformation of the attachment will occur due to the heat transferred from the material powder during sintering. As described above, for the attachment and the additional sidewalls, the additional sidewall is arranged without gaps to surround the attachment. Therefore, when there is a deformation of the attachment, the integrity that maintains the attachment with the additional sidewalls will collapse. As such, gaps are formed between the components, and there is a fear that the material powder will leak out from the gaps during the molding of the laminate shaped object.

The present invention has been made in view of the above circumstances. An objective of the invention is to provide a manufacturing device for a laminate shaped object, wherein the amount of material powder supplied is stably reduced.

Means for Solving the Problems

A manufacturing device for a three-dimensional laminate shaped object in a first embodiment of the invention manufactures a laminate shaped object by supplying material powder to a molding chamber to form a powder layer and irradiating a surface of the powder layer with a beam to sinter the powder layer, wherein the molding chamber includes a table that is vertically movable and a peripheral wall that is disposed to surround the table, and the molding chamber is configured such that a relative positional relation between the table and the peripheral wall in a height direction is changeable. The molding chamber includes a molding space, in which the material powder is irradiated with the beam and the laminate shaped object is formed, and a non-molding space, which is outside the molding space and in which the laminate shaped object is not formed. An elastic member is disposed in the non-molding space, and the elastic member extends or contracts to change volume along with change of a relative position of the table in a vertical direction.

In the present invention, the molding chamber includes the molding space where the laminate shaped object is formed by irradiating the material powder with the beam; and the non-molding space which is outside the molding space and where the laminate shaped object is not formed. The non-molding space further includes the elastic member that extends and contracts and changes volume along with the change of the relative position of the table in the vertical direction. Thus, by disposing the elastic member in the non-molding space, the volume where the material powder is spread onto the non-molding space can be reduced. Therefore, it is possible to suppress the amount of material powder that is supplied into the molding chamber, and the amount of material powder spread into the non-molding space is reduced. Further, as the elastic member is disposed in the non-molding space and not irradiated with the beam, the heat of sintering of the material powder is not directly transferred. As such, it is possible to prevent a heat-induced shape change of the elastic member. Similarly, as it is possible to control the change in the volume of the elastic member, it is possible to control the change in volume of the non-molding space due to change of the volume of the elastic member. Based on the above, the amount of material powder supplied into the molding chamber is stably reduced.

In a manufacturing device for a three-dimensional laminate shaped object in a second embodiment of the invention, based on the first embodiment, the elastic member includes a mountain fold portion and a valley fold portion that are alternately arranged to form a bellows shape.

Herein, in a situation where the elastic member is formed by a plurality of members, for example, a second corner tube member that is slidably inserted inside a first corner tube member, and the length of the elastic member can be changed by pulling out the second corner tube member to change the volume, there is a possibility that a problem might occur where the material powder gets into the connecting space between the plurality of members that constitute the elastic member, hence leading to an inability of the member to extend or contract.

In the present invention, the elastic member includes the mountain fold portion and the valley fold portion that are alternately arranged to form a bellows shape. Thus, by using one member with a changeable volume, the problems concerning the use of a plurality of members to form the elastic member as described above will not occur. Therefore, by changing the relative position of the table in the vertical direction, it is possible to reliably change the volume.

In a manufacturing device for a three-dimensional laminate shaped object in a third embodiment of the invention, based on the second embodiment, the elastic member is disposed along at least two corners of the peripheral wall.

In the invention, the elastic member is disposed along at least two corners of the peripheral wall. Therefore, the elastic member is efficiently disposed in the molding chamber. Since the volume of the non-molding space is reduced to avoid wasting the molding space, it is possible to produce a large laminate shaped object within a limited range.

In a manufacturing device for a three-dimensional laminate shaped object in a fourth embodiment of the invention, based on the second or the third embodiment, when the elastic member is viewed from above, an area of the valley fold portion is 0.35 times or less an area of the mountain fold portion.

Herein, for the elastic member, as the area of the valley fold portion becomes smaller as compared to the area of the mountain fold portion, the elastic member can be folded with a less folding number. That is, by making the width of the valley fold portion small to increase the difference between the area of the valley fold portion and the area of the mountain fold portion, the thickness of the elastic member when contracted and folded is reduced. Therefore, when the elastic member is contracted and folded, that is, when the manufacturing process of the laminate shaped object starts, the distance between the upper end of the molding chamber and the upper surface of the table is reduced, and the non-molding space formed between the upper end of the molding chamber and the upper surface of the table is made small.

In the present invention, when the elastic member is viewed from above, the area of the valley fold portion is 0.35 times or less the area of the mountain fold portion. Thus, the thickness of the elastic member when contracted and folded is reduced. Accordingly, it is possible to make the non-molding space small. As such, an amount of powder material that is supplied into the molding chamber is reduced.

In a manufacturing device for a three-dimensional laminate shaped object in a fifth embodiment of the invention, based on any one of the first to third embodiments, an upper end of the elastic member is disposed on an upper end portion of the molding chamber.

Here, during the production of the shaped object, the material powder is spread in the space between the upper end of the molding chamber and the upper end of the elastic member. Therefore, as the distance between the upper end of the molding chamber and the upper end of the elastic member is reduced, the space where the material powder is spread is reduced.

In the present invention, the upper end of the elastic member is disposed on the upper end portion of the molding chamber. Therefore, the distance between the upper end of the molding chamber and the upper end of the elastic member is reduced. As it is possible to reduce the space between the upper end of the molding chamber and the upper end of the elastic member, an amount of material powder that is supplied into the molding chamber is reduced.

In a manufacturing device for a three-dimensional laminate shaped object n a sixth embodiment of the invention, based on any one of the first to fourth embodiments, the elastic member is removably attached.

In the present invention, the elastic member is removably attached. Therefore, it is easy to perform maintenance such as the cleaning process. Further, as the size of the volume of the installed elastic member is easily changeable, it is possible to change the volume of the non-molding space easily. Thus for example, when manufacturing a small laminate shaped object, an elastic member having a large volume may be used, and when manufacturing a large laminate shaped object, an elastic member with a smaller volume may be used. Therefore, it is possible to effectively control the amount of material powder supplied according to the manufacture of the laminate shaped objects with various sizes.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5a is an internal side view of the molding chamber of FIG. 1 prior to the manufacturing of the laminate shaped object.

FIG. 5b is a side view of the molding chamber of FIG. 1 after manufacturing the laminate shaped object.

DESCRIPTION OF THE EMBODIMENTS

Embodiments of the present invention are described below with reference to the accompanying drawings. It should be noted, when viewing the device from the front side, the left side is defined as left, the right side is defined as right, the front side is defined as front, the back side is defined as back, the upper side is defined as upper and the lower side is defined as lower. Appropriate direction languages such as "left", "right", "front", "back", "upper" and "lower" will be used in the following description.

Figure 1:
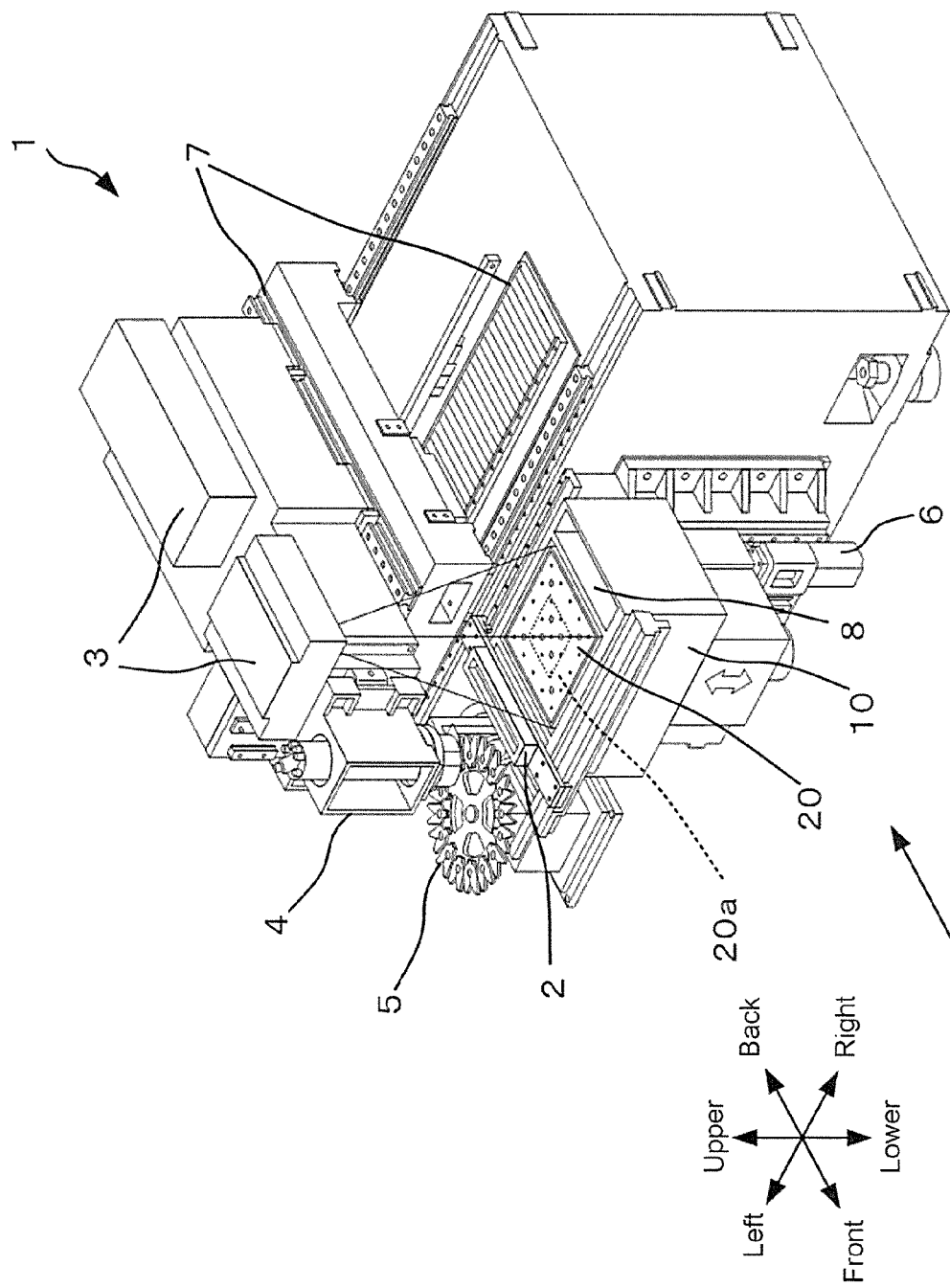
FIG. 1 is a perspective view of a manufacturing device for a three-dimensional laminate shaped object according to the present embodiment.

Referring to FIG. 1, an overview of a manufacturing device 1 will be described. In the manufacturing device 1, a metal material powder supplied through a material supplying device (not shown) accumulates in a molding chamber 10 and forms a powder layer 20. In the manufacturing device 1, the surface of the accumulated powder layer 20 is smoothened and planarized through a planarization device 2. The planarized surface is irradiated with a laser beam through a beam irradiation device 3. Through irradiation of the laser beam, the irradiated portion is sintered to form a sintered layer and solidified.

Next, in the manufacturing device 1, a new powder layer 20 is formed on the surface of the solidified powder layer (sintered layer) 20. Planarization of the powder layer 20 and solidification of the powder layer 20 through the beam irradiation are repeatedly performed so as to stack the layers inside the molding chamber 10 to form a laminate shaped object. In the manufacturing device 1, the outer surface of the formed laminate shaped object is sliced and processed using a slice processing device 4 so as to shape and form a three-dimensional laminate shaped object.

The manufacturing device 1 further includes an automatic tool changing device 5, a vertical position changing mechanism 6, a horizontal position changing mechanism 7 and a discharge tank 8. The automatic tool changing device 5 automatically changes the tools used in the slice processing device 4. The vertical position changing mechanism 6 adjusts a depth of the molding chamber 10, so as to change a height of the powder layer 20. The horizontal position changing mechanism 7 changes a relative positional relation between the beam irradiation device 3 and the molding chamber 10 in a horizontal direction. The discharge tank 8 discharges the material powder that is spilled out of the molding chamber 10 during the planarization of the powder layer 20.

Figure 2:
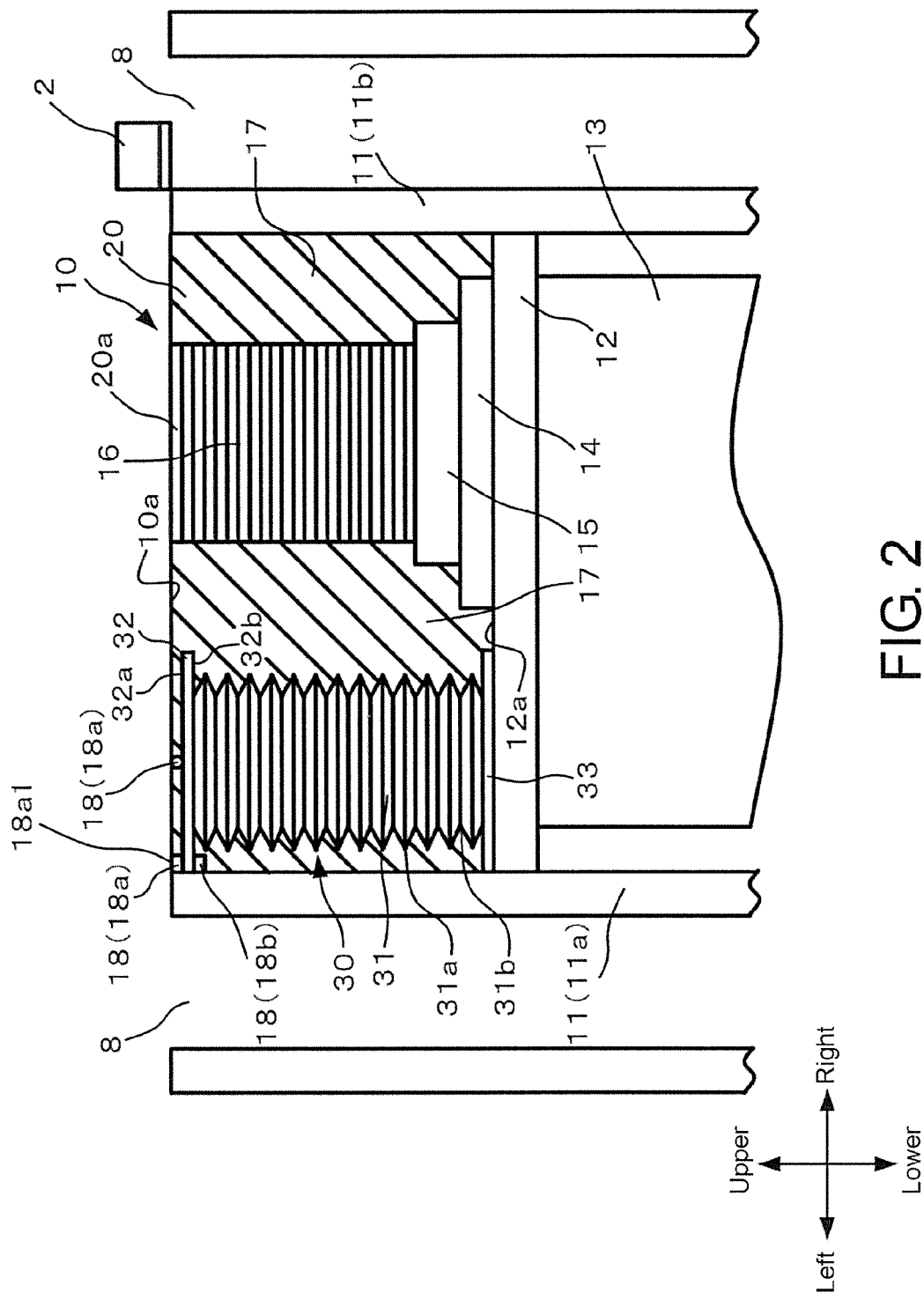
FIG. 2 is an internal side view of the molding chamber according to FIG. 1.

As shown in FIG. 2, the molding chamber 10 includes a peripheral wall 11 and a bottom wall 12. The peripheral wall 11 includes a left side wall 11a, a right side wall 11b, a front wall 11c, and a back wall 11d. The bottom wall 12 function as a table 12, which carries the powder layer 20 to elevate or descend in the height direction. The table 12 is disposed on top of the elevating platform 13, wherein the elevating platform 13 includes the above vertical position changing mechanism 6.

In other words, through the operation of the vertical position changing mechanism 6, the elevating platform 13 is elevated/descended so that the table 12 is elevated/descended to change the relative positional relation between the peripheral wall 11 and the table 12 in the height direction. As such, it is possible to change the height of the powder layer 20 by adjusting a depth of the table 12. In the right side space on the upper surface of the table 12, a substrate 15 is disposed through the spacer 14, and the powder layer 20 is stacked on the upper surface of the substrate 15.

Furthermore, among the spaces inside the molding chamber 10 where the material powder is spread, a space where the material powder is sintered by irradiation with a laser beam to form the laminate shaped object is defined as a molding space 16, whereas a space outside the molding space 16 is defined as a non-molding space 17.

Figure 3:
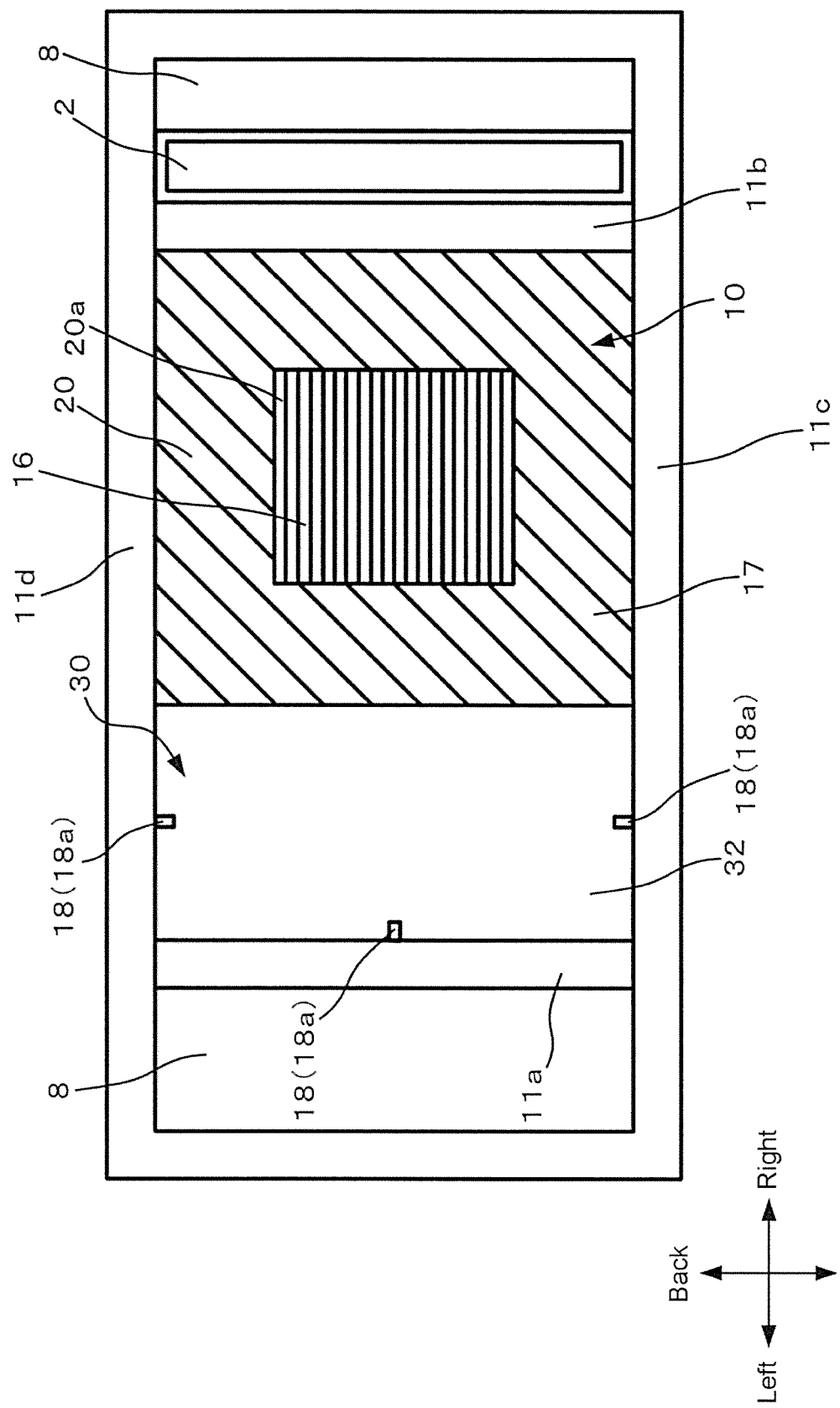
FIG. 3 is a top view of the molding chamber according to FIG. 1.

As shown in FIG. 2 and FIG. 3, an elastic member 30 is disposed in the molding chamber 10 on the left side and extends along the inner walls of three walls, namely the left side wall 11a, the right side wall 11b and the front wall 11c. Further, the elastic member 30 is disposed to extend from the upper end portion of the molding chamber 10 to an upper surface 12a of the table 12. The elastic member 30 includes a bellows member 31, an upper end member 32 and a lower end member 33.

Figure 4:
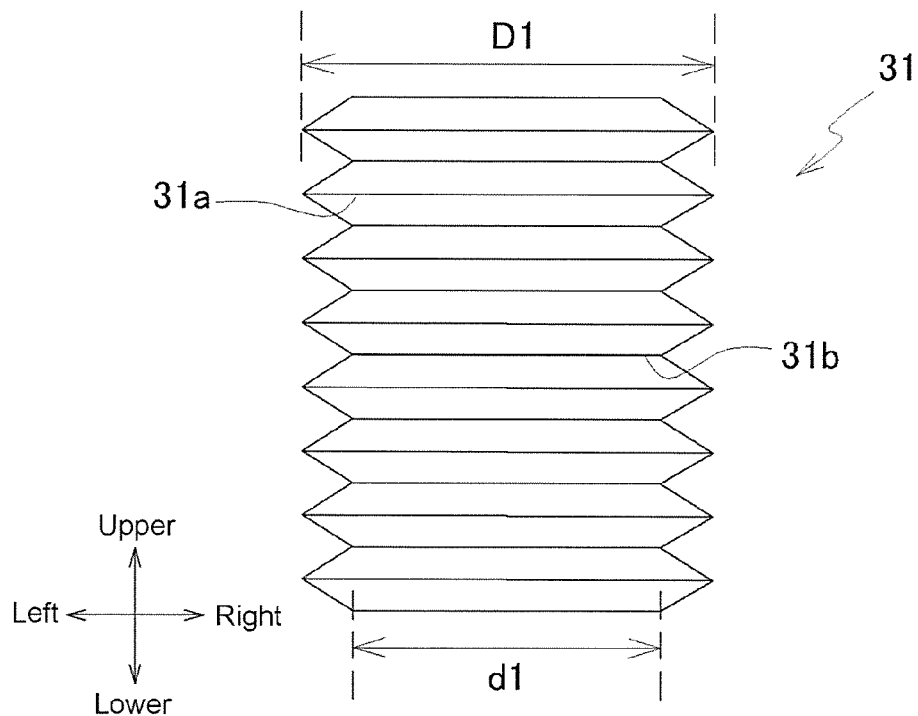
FIG. 4a is a side view of the bellows member.
FIG. 4b is a top view of the bellows member.
Figure 4:
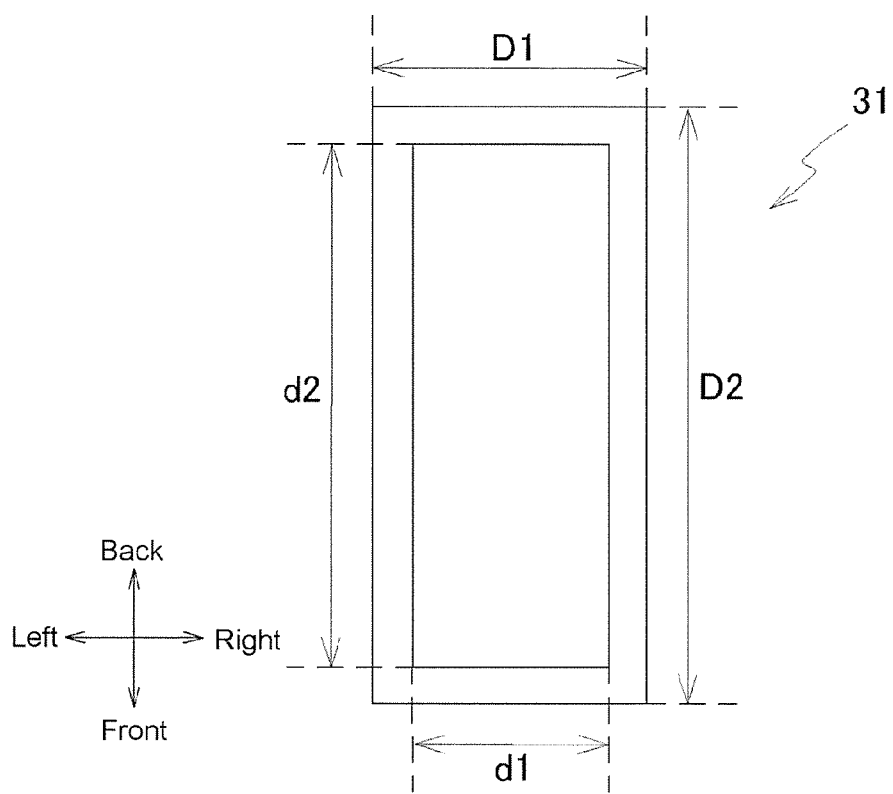

As shown in FIGS. 4a and 4b, the bellows member 31 has a mountain fold portion 31a and a valley fold portion 31b that are alternately arranged to form a bellows with approximately rectangular parallel piped shape. The bellows member 31 is disposed along at least two corners of the peripheral wall 11. More specifically, as shown in FIG. 3, the bellows member 31 is disposed along the corners where the left side wall 11a intersects the front wall 11c and the back wall 11d. For the widths of the mountain fold portion 31a and the valley fold portion 31b, when the bellows member 31 is extended, the width of the valley fold portion 31b is made as small as possible compared to the mountain fold portion 31a in a range to ensure a desired volume. More specifically, for example, in the left/right direction, when the width d1 of the valley fold portion 31b is 55 mm, the width D1 of the mountain fold portion 31a is set to be 125 mm; and in the front/back direction, when the width d2 of the valley portion is 210 mm, the width D2 of the mountain fold portion 31a is set to be 280 mm. That is, in the left/right direction and the front/back direction, the widths D1 and D2 of the mountain fold portion 31a are set to be 70 mm larger than the respective widths d1 and d2 of the valley fold portion 31b. It should be noted that the desired volume mentioned above is consistent with the volume of material powder that is desirably reduced. Moreover, the bellows member 31 is made as thin as possible without being greatly deformed by the pressing force of the material powder supplied to the molding chamber 10. In order to prevent the deformation of the bellows member 31, the inside of the bellows member 31 may, for example, be disposed with a skeleton framework that improves the strength of the bellows member 31. As shown in FIG. 2, at the two terminal ends in the extending direction of the bellows member 31, the upper end member 32 and the lower end member 33 having a corner flange shape are attached.

The upper end member 32 and the lower end member 33 protrude outwards from the side of the bellows member 31. As shown in FIG. 3, when viewed from above, the width of the upper end member 32 and the lower end member 33 in the front/back direction is substantially equal to the distance between the inner wall of the front wall 11c and the inner wall of the back wall 11d. In addition, the width of the upper end member 32 and the lower end member 33 in the left/right direction is greater than the width of the mountain fold portion 31a of the bellows member 31 in the left/right direction, but is made as small as possible. Therefore, as shown in FIG. 2, since it is possible to reduce the distance between the bellows member 31 and the left side wall 11a, the space between the bellows member 31 and the left side wall 11 a becomes small. Thus, the elastic member 30 is disposed efficiently in the molding chamber 10 and the volume of the non-molding space 17 is reduced. Further, the upper end member 32 is fixed by using a first supporting member 18.

The first supporting member 18 includes an upper side protrusion 18a and a lower side protrusion 18b. The upper side protrusion 18a and the lower side protrusion 18b are short pins respectively having a substantially cylindrical shape. The spacing between the upper side protrusion 18a and the lower side protrusion 18b in the height direction is set to be approximately equal to the thickness of the upper end member 32. The upper side protrusion 18a is disposed as high as possible within a height range that does not interfere with the planarization of the material powder by the planarization device 2. More specifically, the upper side protrusion 18a is disposed so that the height of the upper surface 18a of the upper side protrusion 18a is equal to the height of the upper end 10a of the molding chamber 10. Furthermore, as shown in FIG. 3, one first supporting member 18 is respectively disposed on the left side wall 11 a, the right side wall 11 b and the front wall 11c (three first supporting members 18 are disposed in total). More specifically, when viewed from above, the first supporting members 18 are disposed on the left side wall 11a at the center in the front/back direction and on the right side wall 11b and the front wall 11 c to face each other and at a predetermined distance away from the left side wall respectively. As such, the upper end member 32 is inserted between the upper side protrusion 18a and the lower side protrusion 18b of the three first supporting member 18, and held and maintained from three directions. In addition, as shown in FIG. 2, the lower end member 33 is maintained on the upper surface 12a of the table 12 by its own weight and by the weight of the material powder supplied into the molding chamber 10.

By disposing the elastic member 30 as shown in FIG. 5, the table 12 is in a starting position state, ready for the production of a laminate shaped object. That is, from the state where the table 12 is in the uppermost position (FIG. 5a), by using the vertical position changing mechanism 6, the relative positional relation of the peripheral wall 11 and the table 12 in the height direction is changed. Further, when the relative depth of the table 12 becomes deeper, the volume of the elastic member 30 is increased in response to the extension and change of a relative position in the height direction (FIG. 5b).

Next, when the production of the laminate shaped object has been completed and is shifted to the production of the next laminate shaped object, the relative position of the peripheral wall 11 and the table 12 in the height direction is altered by using the vertical position changing mechanism 6. Further, when the relative depth of the table 12 becomes shallow, the volume of the elastic member 30 is decreased in response to the compression and change of a relative position in the height direction (FIG. 5a).

(Effects)

In the present embodiment, as shown in FIG. 2, the elastic member 30 is maintained in the upper end portion of the peripheral wall 11 by the upper end member 32 through the first supporting member 18. The lower end member 33 is maintained on the top surface of the table 12 by its own weight and by the weight of the material powder supplied into the molding chamber 10. Therefore, during molding of the laminate shaped object, for the elastic member 30, the lower end member 33 is lowered along with the descent of the table 12. Accordingly, the bellows member 31 is extended in the up/down direction so as to increase the volume. Therefore, when the elastic member 30 is disposed, it is possible to reduce the volume of the non-molding space 17 where the material powder is spread. Based on the above, it is possible to suppress the amount of material powder that is supplied to the molding chamber 10. Furthermore, after forming the laminate shaped object, a recovered amount of the material powder is reduced.

In addition, as shown in FIG. 2, the elastic member 30 is disposed along the inner walls of the three walls, namely the left side wall 11a, the right side wall 11b and the front wall 11c, and is positioned away from the molding space 16. Therefore, since the heat during the sintering of the material powder is not directly transferred to the elastic member 30, it is possible to prevent a heat-induced deformation. Since it is possible to control the amount of volume change of the elastic member 30, it is possible to control the volume change of the non-molding space 17 due to the volume change of the elastic member 30. Therefore, the amount of the material powder supplied to the molding chamber 10 is reduced in a stable manner.

Moreover, the bellows member 31 of the elastic member 30 is a bellows having the mountain fold portion 31a and the valley fold portion 31b that are alternately arranged. Therefore, by using one member that can extend and contract, the problem that the material powder may get into the connecting space leading to an inability of the elastic member composed of multiple members to extend or contract can be avoided. As such, when molding the laminate shaped object, the volume is reliably changed.

Furthermore, the bellows member 31 is disposed along at least two corners of the peripheral wall 11. More specifically, as shown in FIG. 3, the bellows member 31 is disposed along the corners where the left side wall 11a intersects the front wall 11c and the back wall 11d. Therefore, the elastic member 30 is efficiently disposed in the molding chamber 10. Since the volume of the non-molding space 17 is reduced to avoid wasting the molding space 16, it is possible to produce a large laminate shaped object within a limited range.

In addition, the upper side protrusion 18a is disposed as high as possible within a height range that does not interfere with the planarization of the material powder by the planarization device 2. More specifically, the upper side protrusion 18a is disposed so that the height of the upper surface 18a1 is equal to the height of the upper end 10a of the molding chamber 10. In other words, the distance from the upper end 10a of the molding chamber 10 to the upper end member 32 of the elastic member 30 is equal to the thickness of the upper side protrusion 18a. Therefore, it is possible to minimize the space between the upper end of the molding chamber 10 and the upper end member 32 of the elastic member 30. As such, the amount of material powder supplied to the molding chamber 10 is reduced.

Furthermore, in the elastic member 30, the upper end member 32 is inserted and maintained between the upper side protrusions 18a and the lower side protrusions 18b of the three first supporting members 18, and the lower end member 33 is maintained by its own weight and by the weight of the material powder supplied into the molding chamber 10. Thus, the elastic member 30 is detachable. Therefore, it is easier to perform maintenance, such as the cleaning process. Moreover, as the size of the installed elastic member 30 is easily changeable, it is also possible to freely change the volume of the non-molding space 17. Thus, for example, when manufacturing a small laminate shaped object, an elastic member 30 having a large volume may be used, and when manufacturing a large laminate shaped object, an elastic member 30 with a smaller volume may be used. Therefore, it is possible to effectively control the amount of material powder supplied according to the manufacture of the laminate shaped objects with various sizes.

In addition, the lower end member 33 of the elastic member 30 is maintained on the upper surface 12a of the table 12 by its own weight and by the weight of the material powder supplied into the molding chamber 10. In other words, when the lower end member 33 is maintained on the upper surface 12a of the table 12, other member components are not necessary. As such, a cost for the member components is reduced. Moreover, as there is no member component disposed between the lower end member 33 and the table 12, a distance from the upper end 10a of the molding chamber 10 to the top surface 12a of the table 12 is suppressed. As a result, the non-molding space 17 is made small, and the use of the material powder is further reduced.

In addition, in the left/right direction, when the width d1 of the valley fold portion 31b of the bellows member 31 is 55 mm, the width D1 of the mountain fold portion 31a is set to be 125 mm; and in the front/back direction, when the width d2 of the valley portion is 210 mm, the width D2 of the mountain fold portion 31a is set to be 280 mm. That is, in the left/right direction and the front/back direction, the widths D1 and D2 of the mountain fold portion 31a are set to be 70 mm larger than the respective widths d1 and d2 of the valley fold portion 31b. Therefore, in the bellows member 31, the area of the valley fold portion 31b (55× 210=11550) is 0.33 times the area of the mountain fold portion 31a (125×280=35000). Thus, in the bellows member 31 of the elastic member 30, the difference between the area of the mountain fold portion 31a and the area of the valley fold portion 31b becomes big. As compared to the situation where the folding number is large, the thickness of the bellows member 31 that is folded and contracted is reduced. As such, the non-molding space 17 is made small as shown in FIG. 5a. Furthermore, the bellows member 31 maintains the desired volume during molding. Based on the above, the amount of powder material supplied to the molding chamber 10 is reduced.

Accordingly, the exemplary embodiments of the present invention have been described. However, the invention is not limited to the embodiments and examples described above, and various modifications may be made without going beyond the scope of the claims.

In the above embodiments, although metal material powder is used to form the shaped object, the invention is not limited to the use of metal material powder. For instance, non-metallic material powder such as a resin etc. may be used to form the shaped object.

In addition, in the embodiments described above, the powder layer 20 is sintered and solidified by irradiating a laser beam using the beam irradiation device 3. However, the powder layer 20 may also be solidified by irradiating an electron beam using the beam irradiation device 3.

Moreover, the table 12 is elevated or descended using the vertical position changing mechanism 6, so as to change the relative positional relation between the peripheral wall 11 and the table 12 in the height direction. However, the peripheral wall 11 may also be elevated or descended using the vertical position changing mechanism 6 to change the relative positional relation between the peripheral wall 11 and the table 12 in the height direction.

Figure 6:
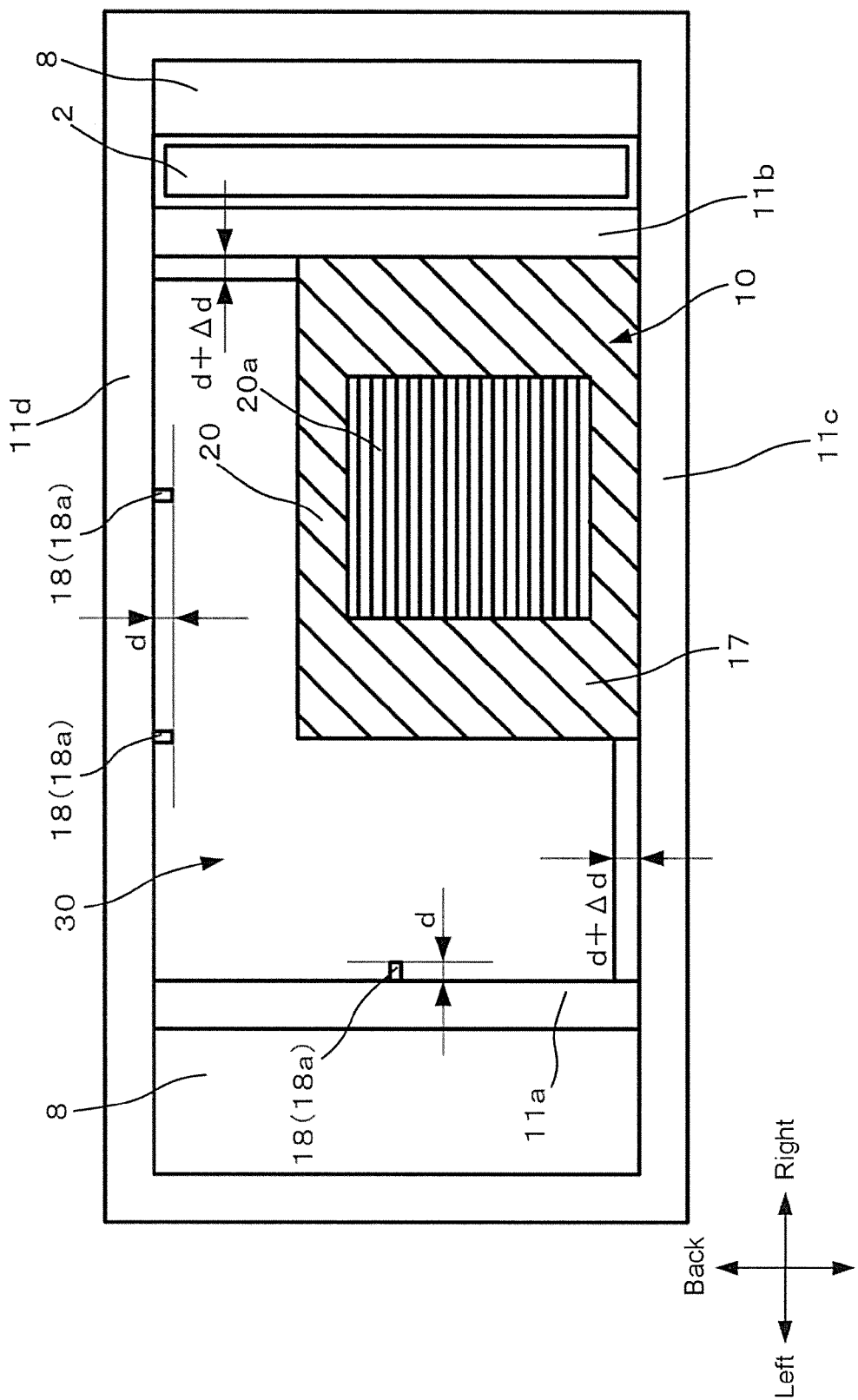
FIG. 6 is a view, equivalent to FIG. 3, illustrating a modified embodiment of an elastic member.

Further, in the above embodiments, although the elastic member 30 is arranged along the left side wall 11a, in the situation where the non-molding space 17 is extend to the right side space of the molding chamber 10, the elastic member 30 may also be arranged along the right side wall 11b. In addition, when the non-molding space 17 is extend to the front side space of the molding chamber 10, the elastic member 30 may be arranged along the front wall 11c. Similarly, when the non-molding space 17 is extend to the front side space of the molding chamber 10, the elastic member 30 may be arranged along the front wall 11c. In other words, depending on the forming space of the non-molding space 17, the elastic member 30 may be arranged along at least one of the left and right side walls 17a, 17b and/or arranged along at least one of the front and back side walls 17c and 17d. In the situation where the non-molding space 17 is extend to either one of the left side and right side, and extend to either one of the front side and back side, then as shown in FIG. 6, the cross sectional shape of the elastic member 30 in the horizontal direction becomes an L-shape pillar. Therefore, the volume of the non-molding space 17 in either the X-axis direction or the Y-axis direction is effectively reduced, which is preferable. It should be noted that, the elastic member 30 is inserted into the first supporting member 18 in the molding chamber 10 from the horizontal direction. Therefore, in the X-axis direction and the Y-axis direction of the elastic member 30, as shown in FIG. 6, for example, regarding the dimensions in the molding chamber 10 in the X-axis direction and Y-axis direction, a clearance dimension of d+Δd greater than the height d of the first supporting member 18 is set.

Furthermore, as described above, the lower end member 33 of the elastic member 30 is maintained on the upper surface 12a of table 12 by its own weight and by the weight of the material powder supplied to the molding chamber 10. However, the lower end member 33 may be maintained on the top surface 12a of the table 12 through other components, for example. More specifically, a U-shaped supporting member with two extending portions that extend along the left direction may be disposed on a top surface of the spacer 14, which is disposed on the table 12. The two extending portions may abut an upper side surface of the lower end member 33 to place the bellows member 31 between the two extending portions, so as to maintain the lower end member 33 on an upper side of the table 12.

Additionally, the elastic member 30 forms an approximately rectangular parallel piped shape and is disposed on the left side of the peripheral wall 11. However, the elastic member 30 may be disposed along the peripheral wall 11 and surround the molding space 16 to form a square shape when viewed from above.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing device of a three-dimensional laminate shaped object, manufacturing a laminate shaped object by supplying material powder to a molding chamber to form a powder layer and irradiating a surface of the powder layer with a beam to sinter the powder layer, wherein the molding chamber comprises a table that is vertically movable and a peripheral wall that is disposed to surround the table, and the molding chamber is configured such that a relative positional relation between the table and the peripheral wall in a height direction is changeable, wherein the molding chamber comprises a molding space, in which the material powder is irradiated with the beam and the laminate shaped object is formed, and a non-molding space, which is outside the molding space and in which the laminate shaped object is not formed, and wherein an elastic member is disposed on an upper surface of the table in the non-molding space, and the elastic member extends or contracts to change volume along with change of a relative position of the table in a vertical direction.

2. The manufacturing device of the three-dimensional laminate shaped object according to claim 1, wherein the elastic member comprises a mountain fold portion and a valley fold portion that are alternately arranged to form a bellows shape.

3. The manufacturing device of the three-dimensional laminate shaped object according to claim 2, wherein the elastic member is disposed along at least two corners of the peripheral wall.

4. The manufacturing device of the three-dimensional laminate shaped object according to claim 2, wherein when the elastic member is viewed from above, an area of the valley fold portion is 0.35 times or less an area of the mountain fold portion.

5. The manufacturing device of the three-dimensional laminate shaped object according to claim 1, wherein an upper end of the elastic member is disposed on an upper end portion of the molding chamber.

6. The manufacturing device of the three-dimensional laminate shaped object according to claim 1, wherein the elastic member is removably attached.

* * * * *